Oct. 15, 1963   R. D. COLLINS   3,106,786
EDUCATIONAL DEVICE
Filed June 2, 1961
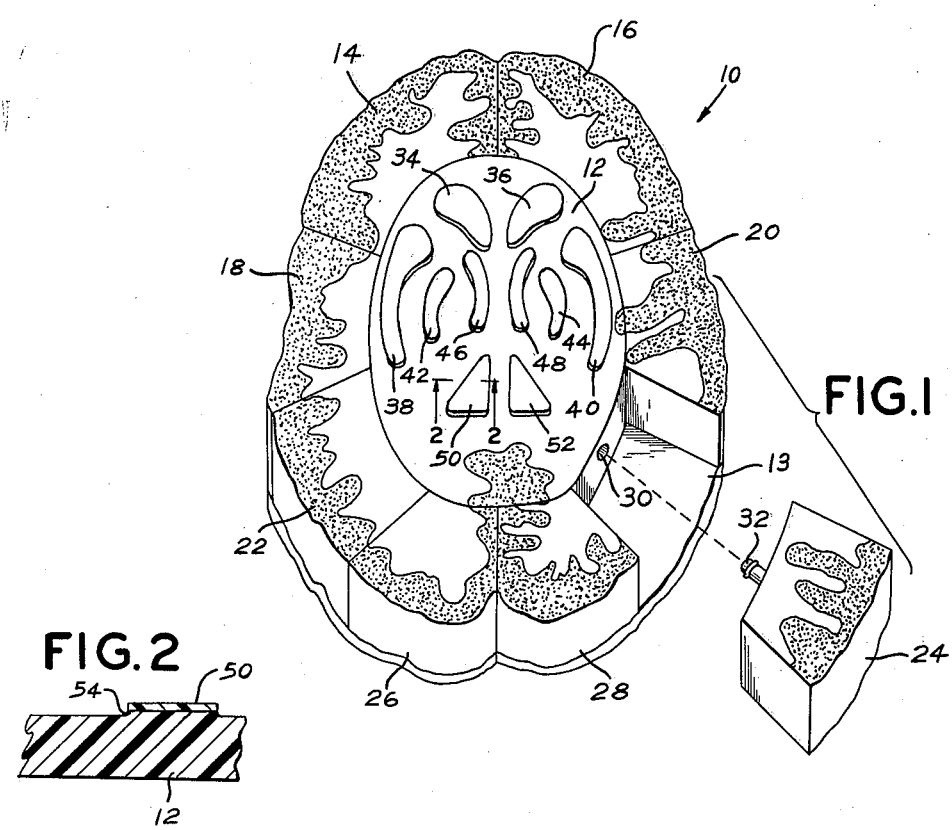
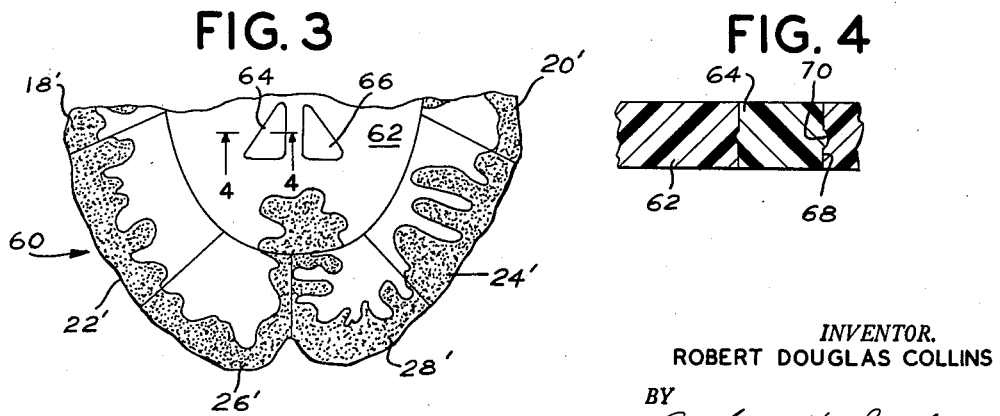
INVENTOR.
ROBERT DOUGLAS COLLINS
BY
*Arthur H. Seidel*
ATTORNEY United States Patent Office 3,106,786
Patented Oct. 15, 1963

3,106,786
EDUCATIONAL DEVICE
Robert Douglas Collins, 2705 Cranston Road,
Philadelphia 31, Pa.
Filed June 2, 1961, Ser. No. 114,488
6 Claims. (Cl. 35—17)

This invention relates to an educational device, and more particularly, to an educational device for teaching the components and diseases associated with a particular portion of the anatomy of a human being. More specifically, the present invention may be termed an educational device simulating a clinicopatholical cerebrum.

Heretofore, the only educational devices available for teaching and/or demonstrating the components and diseases associated with a portion of the anatomy of a human being, such as the brain, were books and/or charts. Such books or charts are unidimensional insofar as their use is concerned in the teaching of medical students or in the explanation to a patient as to the nature of their deficiencies. The present invention is in the nature of a three dimensional educational device. Accordingly, the three dimensional educational device of the present invention is superior to eduational devices which are unidimensional since they are easier to comprehend.

In vertebrate animals, the brain is the large mass of nerve tissue enclosed in the skull or cranium in which the anterior end of the spinal cord terminates. The brain consists of gray matter made up largely of nerve cells, and white matter made up chiefly of nerve fibers.

The brain is comprised chiefly of five components. The present invention is directed to a teaching device associated with one component thereof, namely the cerebrum. The cerebrum is that portion of the brain associated with consciousness. The cerebrum includes a cerebral cortex or gray matter which may be regarded as the seat of consciousness and white matter interconnecting and coordinating the function of the gray matter. The cerebrum also includes a plurality of lobes, nerve cells and nerve tracts.

The educational device of the present invention is adapted to be utilized in the explanation of the components of the cerebrum and the relationship between the components and various diseases associated with the cerebrum. The educational device of the present invention includes removable elements simulating the components of the cerebrum so that certain components may be removed so that the pathological effect may be demonstrated when discussing a particular disease.

It is an object of the present invention to provide a novel educational device.

It is another object of the present invention to provide a novel educational device particularly adapted for teaching the components and diseases of the cerebrum of the brain in vertebrate animals.

It is another object of the present invention to provide a novel educational device having removable components which are adapted to simulate the effect on, absence or presence of various lobes, tracts, and/or cells of the cerebrum.

It is still another object of the present invention to provide a novel educational device wherein elements simulating tracts, cells, and lobes of a cerebrum are removably secured to a base simulating the white matter of a cerebrum, whereby the components and diseases of the cerebrum may be effectively taught to a novice.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is an exploded perspective view of the device of the present invention.

FIGURE 2 is a transverse sectional view taken along the lines 2—2 in FIGURE 1.

FIGURE 3 is a partial plan view of another embodiment of the present invention.

FIGURE 4 is a transverse sectional view taken along the lines 4—4 in FIGURE 3.

Referring to the drawing in detail, wherein like numerals indicate like elements, there is shown in FIGURE 1 a perspective view of the present invention designated generally as 10.

The educational device 10 includes a flat base 12 which simulates the white matter of the cerebral cortex. The base 12 is provided with a peripheral flange 13 with a bottom surface on the flange being flush with a bottom surface on the base 12.

A plurality of removable sections simulating the lobes of the cerebrum are supported on the flange 13 and removably secured to the base 12. The section 14 simulates the left front lobe, section 16 simulates the right front lobe, section 18 simulates the left temporal lobe, section 20 simulates the right temporal lobe, section 22 simulates the left parietal lobe, section 24 simulates the right parietal lobe, section 26 simulates the left occipital lobe and section 28 simulates the right occipital lobe.

As illustrated in FIGURE 1, the flange 13 extends from the base 12 for a distance corresponding to the width of the sections 14—28. Each of the sections 14—28 are provided with a stud which is adapted to be inserted in a blind hole in the base 12 with a friction fit therebetween. For example, section 24 is provided with a stud 32 which is adapted to be received within the hole 30. If desired, the stud may be integrally secured to the base 12 or flange 13 and be adapted to be received within a hole in the removable sections simulating the lobes of the cerebrum.

A plurality of wafer-like elements are removably secured to the upper surface of the base 12. Preferably, the elements are provided with a pressure sensitive adhesive coating on one surface thereof which facilitates the removable securement of the same to the base 12.

Removable elements 34 and 36 simulate the nerve cells commonly referred to as the left and right caudate nucleus, respectively. The removable elements 38 and 40 simulate nerve cells commonly referred to as the left and right putamen, respectively. Removable elements 42 and 44 are disposed intermediate the elements 38 and 40 and simulate nerve cells commonly referred to as the left and right globus pallidus, respectively.

Removable elements 46 and 48 disposed intermediate the elements 42 and 44 simulate nerve tracts commonly referred to as the left and right pyramidal tracts, respectively.

Removable elements 50 and 52 are disposed below the elements 46 and 48 and simulate nerve cells commonly referred to as the left and right thalamus, respectively. The base 12 is preferably provided with an embossment of substantially the same size as the elements 34—52. The embossment facilitates the replacement of the removable elements in their correct disposition. For example, as shown more clearly in FIGURE 2 the base 12 is provided with an embossment 54 over which the removable element 50 is disposed.

It will be noted that the peripheral portion of the sections simulating the lobes are stippled so as to simulate gray matter. The educational device 10 of the present invention is preferably made from a synthetic resin with the stippled area being provided with a darker color than the remainder of the sections simulating the lobes and the base 12. Preferably, the removable elements 34—52 are made from a different color so as to provide a contrast between the removable elements, the removable sections, and the base 12.

An alternative embodiment of the present invention designated generally as 60 is shown partially in plan view in FIGURE 3. The educational device 60 is identical with the educational device 10 except as will be made clear hereinafter. Thus, the educational device 60 includes a base 62 which is identical with the base 12 with removable sections 22', 24', 26' and 28' being provided on a peripheral flange. The removable sections 22', 24', 26' and 28' are identical with their counterpart in the educational device 10.

Removable elements 64 and 66 are provided on the base 62. The removable elements 64 and 66 are identical with the elements 50 and 52, respectively. As shown more clearly in FIFGURE 4, the base 62 is provided with a hole 68 extending therethrough. A groove 70 is provided in the base 62, with said groove being in communication with the hole 68.

The removable element 64 is provided with a ridge on its peripheral surface intermediate the upper and lower surfaces thereof which is adapted to be snap-fitted in the groove 70. In order to remove the element 64, it is only necessary to apply pressure with a finger so as to push the element 64 out of the hole 68. It will be understood that the other removable elements on the base 62 are removably secured thereto in like manner.

While I have illustrated two embodiments illustrating different ways in which the removable elements and sections are secured to the base 12, it will be obvious to those skilled in the art that additional equivalent means may be provided to removably secure the elements and sections to the base 12.

When the educational devices 10 and 60 of the present invention are being used, they will be held by the instructor. As the various components of the cerebrum are enumerated and their function explained, the removable element or section corresponding to the particular component may be removed from its securement with the base 12 or base 62.

In a discussion centered around the various diseases or injuries associated with the cerebrum, the removability of the elements and sections simulating the components of the cerebrum are of great significance. For example, if the instructor should remove section 28, the educational device will simulate a clinicopathological cerebrum suffering from a right posterior cerebral artery thrombosis.

In like manner, if section 20 were removed from its securement with the base, the educational device will simulate a clinicopathological cerebrum suffering from a right middle cerebral artery thrombosis. If elements 40, 44 and 48 are removed from securement with the base, the educational device will simulate a clinicopathological cerebrum suffering from an intracerebral hemorrhage. In like manner, if removable elements 34 and 36 are removed, the educational device will simulate a clinicopathological cerebrum suffering from Huntington's chorea.

It will be appreciated by those skilled in the art that the removability of the elements and sections of the device 60 may be used in the same manner as set forth above. Also, it will be appreciated that the above illustrations are merely exemplary of some of the diseases or injuries which may be effectively explained by means of the educational device of the present invention.

Thus, it will be seen that I have invented a novel educational device simulating the clinicopathological cerebrum wherein elements and sections are removably secured to a base whereby nerve cells, nerve tracts and lobes and diseases associated therewith may be more effectively taught to a novice.

The present invention may be embodied in other specific forms without departing from the spirit or essential attributes thereof and, accordingly, reference should be made to the appended claims, rather than to the foregoing specification as indicating the scope of the invention.

I claim:
1. An educational device comprising means simulating a clinicopathological cerebrum so that the components of the cerebrum at various levels are superimposed so as to appear to be at the same level, said means including a flat base simulating the white matter of a cerebrum, a plurality of flat sections connected to said base and simulating the lobes of a cerebrum, elements removably secured to said base for simulating nerve tracts, elements removably secured to said base for simulating nerve cells, said elements lying in substantially the same plane, means on said lobes for simulating gray matter of a cerebrum, whereby the components and pathological diseases of the cerebrum may be more effectively taught to a novice by removing one or more of said lobes and/or elements.

2. An educational device in accordance with claim 1 wherein said base is made from a plastic material and is provided with a peripheral flange, said removable sections overlying said flange.

3. An educational device in accordance with claim 1 wherein said elements simulating nerve tracts and cells are removably secured to an upper surface of said base, and said sections being removably secured to a peripheral edge surface of said base, with the upper surface of said sections being substantially flush with the upper surface of said base.

4. An educational device in accordance with claim 1 wherein said removable elements simulating nerve tracts and cells are snap-fitted in holes in said base so that the upper surface of said elements are substantially flush with the upper surface of said base.

5. An educational device in accordance with claim 1 wherein said elements simulating nerve cells and tracts are in the form of wafers with a pressure sensitive adhesive coating on one surface thereof, said base being provided with embossments corresponding with the shape of said elements, and said elements being secured to said embossments on an upper surface of said base.

6. An educational device comprising means simulating a clinicopathological cerebrum, said means including a flat base, elements simulating nerve tracts removably secured to said base in a manner so as to be visible when viewing one surface of said base, elements simulating nerve cells removably secured to said base in a manner so as to be visible when viewing said one surface of said base, sections removably secured to said base adjacent the periphery of said base so as to be visible when viewing said one surface of said base, with said removable sections forming the ring around said removable elements, whereby the components and pathological diseases of the cerebrum may be more effectively taught to a novice.

References Cited in the file of this patent
UNITED STATES PATENTS

| | | |
|---|---|---|
| 1,381,957 | Anderson | June 21, 1921 |
| 2,256,667 | Doret | Sept. 23, 1941 |
| 2,592,078 | Taylor et al. | Apr. 8, 1952 |
| 2,995,833 | Bezark | Aug. 15, 1961 |

OTHER REFERENCES

Chicago Apparatus Co. Catalog No. 44, pages 790 and 791 only are of interest (1931).

Clay-Adams Co. Catalog No. 105, pages 168 and 169 only are relied on (1953).